United States Patent
Usui et al.

(10) Patent No.: US 12,427,744 B2
(45) Date of Patent: Sep. 30, 2025

(54) DECORATIVE SHEET AND DECORATIVE MEMBER

(71) Applicant: Dai Nippon Printing Co., Ltd., Tokyo (JP)

(72) Inventors: Hironaga Usui, Tokyo (JP); Keisuke Tsuruta, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 18/284,369

(22) PCT Filed: Feb. 25, 2022

(86) PCT No.: PCT/JP2022/008001
§ 371 (c)(1),
(2) Date: Sep. 27, 2023

(87) PCT Pub. No.: WO2022/209492
PCT Pub. Date: Oct. 6, 2022

(65) Prior Publication Data
US 2024/0157668 A1 May 16, 2024

(30) Foreign Application Priority Data

Mar. 30, 2021 (JP) .................. 2021-057853
Aug. 20, 2021 (JP) .................. 2021-135177

(51) Int. Cl.
*B32B 3/14* (2006.01)
*B32B 3/30* (2006.01)
(Continued)

(52) U.S. Cl.
CPC ............. *B32B 3/14* (2013.01); *B32B 3/30* (2013.01); *B32B 27/08* (2013.01); *B32B 27/20* (2013.01);
(Continued)

(58) Field of Classification Search
CPC ................................. B32B 2451/00
See application file for complete search history.

(56) References Cited

U.S. PATENT DOCUMENTS

2010/0173132 A1   7/2010   Furukawa

FOREIGN PATENT DOCUMENTS

EP   2067616 A1   6/2009
EP   3326802 A1   5/2018
(Continued)

OTHER PUBLICATIONS

Translation of WO-2020175628-A1 (Year: 2020).*
(Continued)

*Primary Examiner* — Ian A Rummel
(74) *Attorney, Agent, or Firm* — Troutman Pepper Locke LLP

(57) ABSTRACT

A decorative sheet includes a design layer that displays a design; and a raised layer stacked to the design layer. The raised layer includes a raised portion provided in a region overlapping a partial region of the design layer. The raised portion includes a binder resin, resin particles, and inorganic particles. An average particle size of the resin particles is larger than an average particle size of the inorganic particles. The raised portion includes protrusions formed by protrusion of the inorganic particles.

13 Claims, 2 Drawing Sheets

(51) Int. Cl.
  *B32B 27/08* (2006.01)
  *B32B 27/20* (2006.01)
(52) U.S. Cl.
  CPC ....... *B32B 2250/02* (2013.01); *B32B 2451/00* (2013.01)

(56) References Cited

FOREIGN PATENT DOCUMENTS

| | | |
|---|---|---|
| JP | S52-076115 U | 6/1977 |
| JP | 2004-262105 A | 9/2004 |
| JP | 2005-212237 A | 8/2005 |
| JP | 2008-087269 A | 4/2008 |
| JP | 2008-238602 A | 10/2008 |
| JP | 2016-215423 A | 12/2016 |
| JP | 2018-079603 A | 5/2018 |
| JP | 2019-217740 A | 12/2019 |
| JP | 2022-53446 A | 4/2022 |
| WO | 2020/175628 A1 | 9/2020 |

OTHER PUBLICATIONS

Office Action dated Sep. 6, 2022, issued for JP2021-135177 and English translation thereof.
English translation of Written Opinion of the International Searching Authority mailed Apr. 26, 2022, issued for PCT/JP2022/008001.
Office Action mailed Jan. 28, 2025, issued for the Japanese Patent Application No. 2022-201013 and English translation thereof.
Extended European Search Report dated Mar. 20, 2025, issued to the European Patent Application No. 22779717.2.

\* cited by examiner

DECORATIVE SHEET AND DECORATIVE MEMBER

TECHNICAL FIELD

The present invention relates to a decorative sheet and a decorative member.

BACKGROUND ART

Decorative sheets are bonded to various members for the purpose of decoration. Examples of the various members include interior materials and exterior materials such as furniture and fittings; surfaces of walls of buildings; interior space surfaces such as floors and ceilings; surfaces of interior decorations and fixtures such as spandrel walls, moldings, and lintels (Kamois, parts that pass over sliding doors); exterior surfaces such as exterior walls, roofs, door pockets, and eave soffits of buildings; outdoor structure surfaces such as fences and walls; interior surfaces and surfaces of exterior portions of fittings such as window frames, door frames, doors, and partitions; surfaces of furniture such as drawers and cabinets; interior space surfaces and exterior space surfaces of vehicles such as automobiles, railroad vehicles, ships, and aircraft; and surfaces of various home electric appliances, office equipment, and the like.

A basic layer configuration of a decorative sheet is a layer configuration including a design layer and a surface protective layer on or above a substrate. This decorative sheet is poor in tactile sensation (tactile impression). This decorative sheet cannot impart a tactile sensation (tactile impression) of natural wood such as a sliced veneer. PTL 1 (JP2019-217740A), PTL 2 (JP2004-262105A), and PTL 3 (JP2005-212237A) propose decorative sheets capable of imparting tactile sensations.

The decorative sheet described in PTL 1 has an uneven shape formed by embossing the surface. The decorative sheet of PTL 1 can impart a tactile sensation by the uneven shape of the surface.

The decorative sheet described in PTL 2 includes a substrate, a specific first surface protective layer, and a second surface protective layer including synthetic resin beads having an average particle size of 10 μm or more and 30 μm or less. The average film thickness of a portion of the second surface protective layer excluding the synthetic resin beads protruding from the surface of the second surface protective layer is 3 μm or more and 6 μm or less. The decorative sheet described in PTL 2 can impart a predetermined tactile sensation but cannot reduce gloss. When the gloss of the decorative sheet increases, it becomes difficult to express the appearance of a natural object such as natural wood.

The decorative sheets of the related art described in PTLs 1 to 3 cannot attain both of imparting an excellent tactile sensation and reducing the gloss.

SUMMARY OF INVENTION

It is an object of the present disclosure to impart an excellent tactile sensation to a decorative sheet and to reduce gloss of the decorative sheet.

According to an embodiment of the present disclosure, a decorative sheet includes:
a design layer that displays a design; and
a raised layer stacked to the design layer,
the raised layer includes a raised portion provided in a region overlapping a partial region of the design layer,
the raised portion includes a binder resin, resin particles, and inorganic particles,
an average particle size of the resin particles is larger than an average particle size of the inorganic particles, and
the raised portion includes protrusions formed by protrusion of the inorganic particles.

According to an embodiment of the present disclosure, a decorative sheet is
a decorative sheet including a raised portion in at least a partial region on or above a substrate,
the raised portion includes a binder resin, resin particles, and inorganic particles, and
a thickness of the raised portion is partially different.

According to the present disclosure, the excellent tactile sensation can be imparted to the decorative sheet and the gloss of the decorative sheet can be reduced.

DESCRIPTION OF EMBODIMENTS

Figure 1:
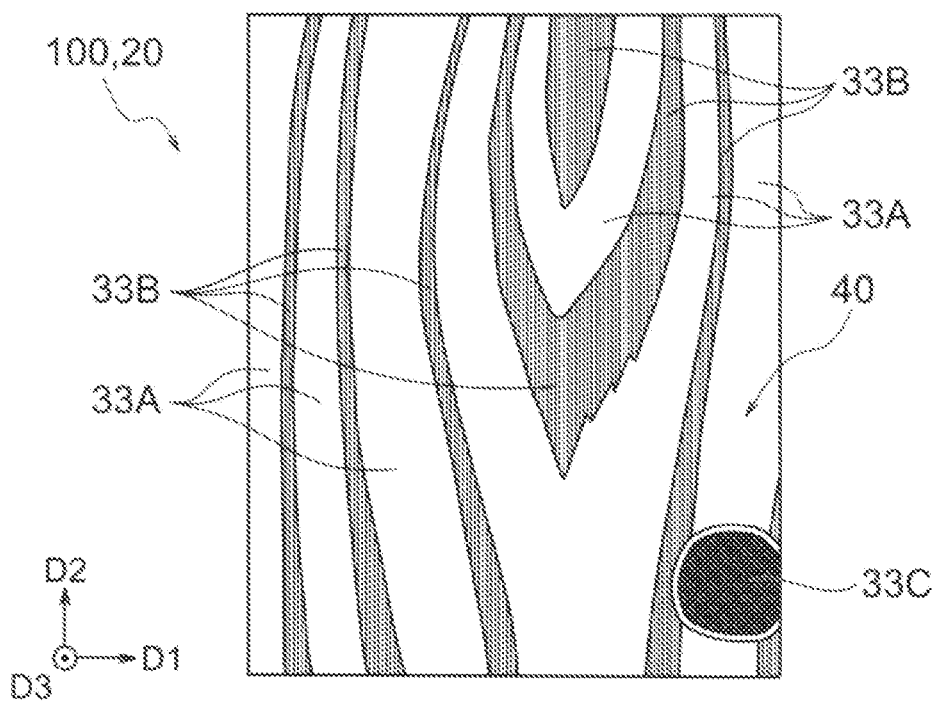
FIG. 1 is a diagram explaining an embodiment of the present disclosure and is a plan view illustrating an example of a decorative member and a decorative sheet.

Hereinafter, an embodiment of the present disclosure will be described with reference to the drawings. In the drawings attached to the present description, for convenience of illustration and understanding, a scale, an aspect ratio, and the like are appropriately changed and exaggerated from those of an actual product.

A first direction D1, a second direction D2, and a third direction D3 are indicated in some of the drawings by arrows with common reference signs for clarity of directional relationships between the drawings. A tip side of an arrow is a first side in each direction. As illustrated in FIG. 1, an arrow directed from the plane of the drawing toward the viewer in a direction perpendicular to the plane of the drawing is indicated by a symbol with a dot in a circle. In the illustrated example, the third direction D3 is the normal direction of a decorative sheet 20. The illustrated flat decorative sheet 20 extends in the first direction D1 and the second direction D2. The first direction D1 and the second direction D2 are orthogonal to the third direction D3. The first direction D1 and the second direction D2 are orthogonal to each other.

[Decorative Sheet and Decorative Member]

The decorative sheet 20 includes a design layer 40 and a raised layer 50. The design layer 40 displays a design. The design layer 40 illustrated in FIG. 1 has a pattern of a surface of a tree. The raised layer 50 includes a raised portion 55 provided in a region overlapping a partial region of the design layer 40. The raised portion 55 includes a binder resin 60, resin particles 61, and inorganic particles 62. The average particle size of the resin particles 61 is larger than the average particle size of the inorganic particles 62.

In an embodiment, the decorative sheet 20 is devised to attain both an excellent tactile sensation and low gloss. As a specific configuration, the decorative sheet may have a configuration illustrated in FIGS. 2 to 4. The raised portion 55 may include protrusions 56 formed by protrusion of the inorganic particles 62. In the example illustrated in FIG. 4, a depression 57 is formed between an inorganic particle 62A and an inorganic particle 62B. The top of the inorganic particle 62A protrudes toward the first side in the third direction D3 from the position of a minimum thickness TA in the depression 57.

Figure 2:
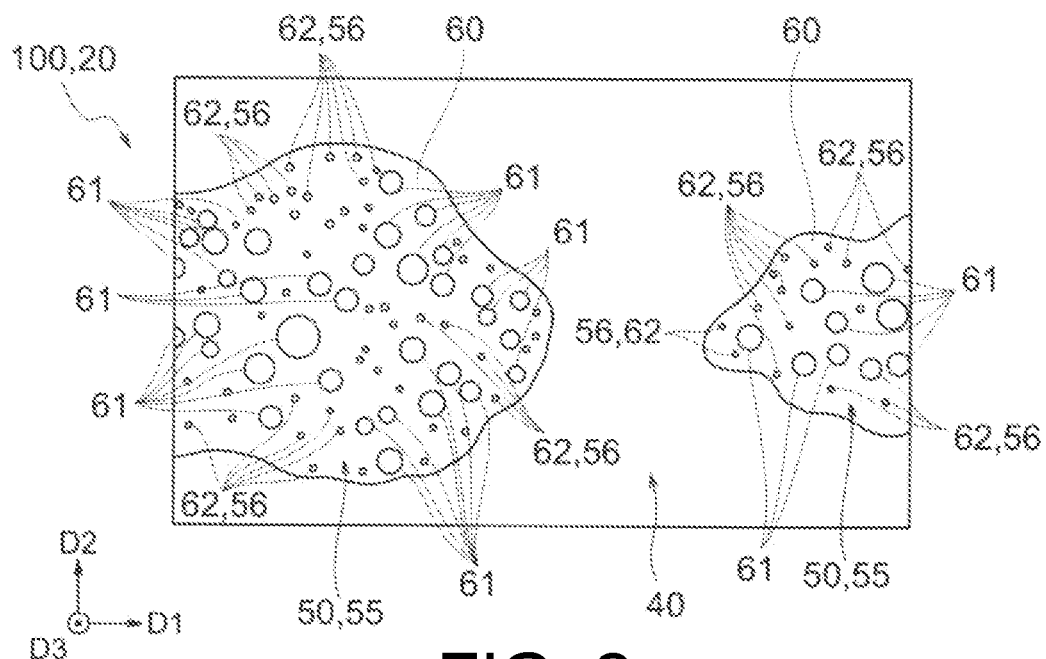
FIG. 2 is a plan view illustrating the decorative sheet illustrated in FIG. 1 in an enlarged manner.
Figure 3:
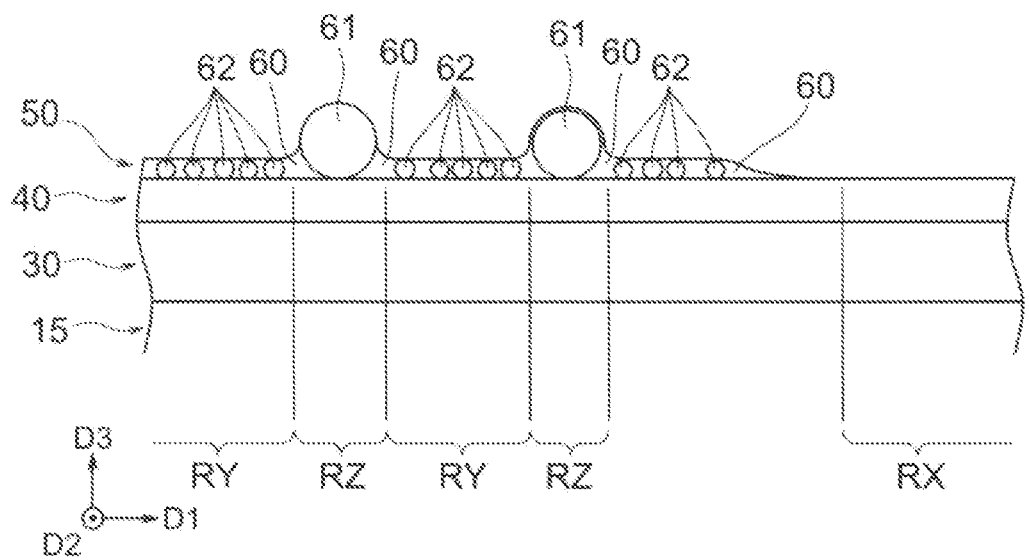
FIG. 3 is a longitudinal sectional view of the decorative sheet illustrated in FIG. 1.
Figure 4:
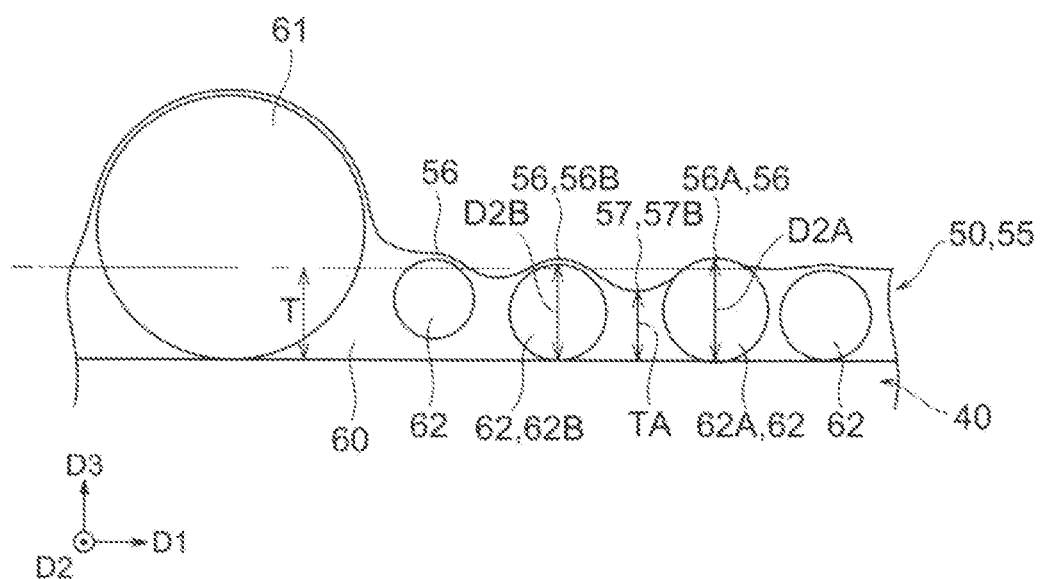
FIG. 4 is a longitudinal sectional view illustrating the decorative sheet illustrated in FIG. 1 in a further enlarged manner as compared to FIG. 3.

According to the present embodiment, the thickness of one portion of the raised portion 55 can be set to a thickness corresponding to the average particle size of the resin particles 61, and the thickness of another portion of the raised portion 55 can be set to a thickness corresponding to the particle size of the inorganic particles 62. As a result, as illustrated in FIG. 3, the decorative sheet 20 includes a region RX where the raised portion 55 is not provided, a region RZ where the resin particles 61 of the raised portion 55 protrude, and a region RY where the thickness is set by the inorganic particles 62 of the raised portion 55. The decorative sheet 20 has mutually different heights in the three regions RX, RY, and RZ. When the decorative sheet 20 is touched, a strong tactile sensation is imparted from the resin particles 61 in the region RZ. In the region RY where the thickness is determined by the inorganic particles 62, a strong tactile sensation due to the presence of the inorganic particles 62 is imparted. In addition, as illustrated in FIGS. 2 and 4, the tops of the protrusions 56 are dispersed in the region RY. A complex tactile sensation can be expressed by the tops of the dispersed protrusions 56. Accordingly, a strong tactile sensation can be imparted with rich expression.

The surfaces of the inorganic particles 62 are reduced in gloss. In the region RY where the thickness is determined by the inorganic particles 62, the inorganic particles 62 protrude from the binder resin 60 and are exposed from the binder resin 60. Alternatively, the inorganic particles 62 are located in the vicinity of the surface of the raised portion 55. Thus, the gloss of the raised portion 55 can be sufficiently reduced.

As described above, an excellent tactile sensation can be imparted to the decorative sheet 20, and the gloss of the decorative sheet 20 can be reduced. That is, various tactile sensations can be imparted in an emphasized manner, and the gloss is reduced. Thus, with the decorative sheet 20, an artificial impression can be weakened and a natural feeling can be created.

As illustrated in FIG. 3, the decorative member 100 may include a support member 15 and a decorative sheet 20. The support member 15 is an adherend of the decorative sheet 20. The support member 15 is imparted with design properties by using the decorative sheet 20. Examples of the support member 15 include a woody member such as a veneer, plywood, a particleboard, a medium-density fiberboard (MDF), or a woody fiberboard, for example, a laminated wood, made of one or more of various woods such as Japanese cedar, Japanese cypress, pine, and lauan and used as a plate member, a three-dimensional article, or the like; a metallic member made of iron, aluminum, or the like and used as a plate member, a steel sheet, a three-dimensional article, a sheet, or the like; a ceramic member made of a ceramic such as glass, pottery, or porcelain, a non-cement ceramic-based material such as gypsum, or a non-pottery/non-porcelain ceramic-based material, for example, an autoclaved lightweight concrete (ALC) plate and used as a plate member, a three-dimensional article, or the like; and a resin member made of an acrylic resin, a polyester resin, a polyolefin resin such as polystyrene or polypropylene, an acrylonitrile-butadiene-styrene copolymer (ABS) resin, a phenol resin, a vinyl chloride-based resin, a cellulose resin, rubber, or the like and used as a plate member, a three-dimensional article, a sheet, or the like.

As described above, the decorative sheet 20 includes the design layer 40. The design layer 40 illustrated in FIG. 1 has a pattern of a surface of a tree. The decorative sheet 20 illustrated in FIG. 1 expresses a surface of a tree. The tree expressed by the decorative sheet 20 is not particularly limited. The tree expressed by the decorative sheet 20 may be wood skin of a tree, such as Japanese cedar, Japanese cypress, walnut, pine, cherry tree, or the like. As illustrated in FIGS. 3 and 4, the decorative sheet 20 may also include a substrate 30. Hereinafter, each component of the decorative sheet 20 will be described in more detail.

<Substrate>

The substrate may be a flat plate such as a film, a sheet, or a plate. The film, the sheet, and the plate are often referred to as a film, a sheet, and a plate in the order from one having a relatively small thickness, but in the present description, these three are not distinguished from each other unless otherwise specified.

Examples of the material of the substrate include a resin, a metal, a non-metallic inorganic material, a fibrous material, and a woody material. The material of the substrate may be appropriately selected in accordance with the application.

The substrate may include one layer. The substrate may include two or more laminated layers made of the above-described materials. When the substrate is a laminate of two or more layers, two or more layers of different materials may be laminated to complement various properties of the materials of the respective layers. Examples of the substrate formed by laminating two or more layers include A to J below.

(A) A laminate of a resin and a woody material
(B) A laminate of a resin and a metal
(C) A laminate of a resin and a fibrous material
(D) A laminate of a resin and a non-metallic inorganic material
(E) A laminate of a resin 1 and a resin 2
(F) A laminate of a metal and a woody material
(G) A laminate of a metal and a non-metallic inorganic material
(H) A laminate of a metal and a fibrous material
(I) A laminate of a metal 1 and a metal 2
(J) A laminate of a non-metallic inorganic material and a fibrous material In the above-described E, the resin 1 and the resin 2 may be different kinds of resins. For example, the resin 1 may be an olefin resin and the resin 2 may be an acrylic resin. In the above-described I, the metal 1 and the metal 2 may be different kinds of metals. For example, the metal 1 may be copper and metal 2 may be chromium.

When the substrate is a laminate of any one of the above-described A to J, a layer (an adhesive layer or the like) for enhancing the adhesive force may be provided between the respective constituent layers of the laminate.

Examples of the resin used for the substrate include various synthetic resins and various natural resins. Examples of the synthetic resins include a thermoplastic resin and a cured product of a curable resin composition.

Examples of the thermoplastic resin include olefin resins such as polyethylene, polypropylene, polymethylpentene, ionomers, and various olefin-based thermoplastic elastomers; vinyl chloride-based resins such as polyvinyl chloride, polyvinylidene chloride, and vinyl chloride-vinyl acetate copolymers; polyester resins such as polyethylene terephthalate, polybutylene terephthalate, polyethylene naphthalate, ethylene glycol-terephthalic acid-isophthalic acid copolymers, and polyester-based thermoplastic elastomers; acrylic resins such as polymethyl (meth)acrylate, polyethyl (meth)acrylate, polybutyl (meth)acrylate, and methyl (meth) acrylate-butyl (meth)acrylate copolymers; polyamide resins represented by nylon 6, nylon 66, and the like; cellulose-based resins such as cellulose triacetate, cellophane, and celluloid; styrene-based resins such as polystyrene, acrylonitrile-styrene copolymers, and acrylonitrile-butadiene-styrene (ABS) copolymers; polyvinyl alcohol; ethylene-vinyl acetate copolymers; ethylene-vinyl alcohol copolymers; polycarbonate resins; polyarylate resins; and polyimide resins.

Examples of the curable resin composition include a thermosetting resin composition and an ionizing radiation-curable resin composition exemplified for a matte layer (described later).

Examples of the natural resins include natural rubber, pine resin, and amber.

Examples of the metal used for the substrate include aluminum and alloys including aluminum such as duralumin; iron and alloys including iron such as carbon steel and stainless steel; copper and alloys including copper such as brass and bronze; gold; silver; chromium; nickel; cobalt; tin; and titanium. The metallic substrate may include a plating layer plated with such a metal.

Examples of the non-metallic inorganic material used for the substrate include non-ceramic-based materials produced by ceramic engineering such as cement, autoclaved lightweight concrete (ALC), gypsum, calcium silicate, and wood chip cement; ceramic-based materials produced by ceramic engineering such as pottery and porcelain, earthenware, glass, and porcelain enamel; and natural stones such as limestone, marble, granite, and andesite.

Examples of the fibrous material used for the substrate include papers such as tissue papers, kraft papers, wood free papers, Japanese papers, titanium papers, linter papers, sulfate papers, paraffin papers, parchment papers, glassine papers, backing papers for wallpaper, paperboards, and base papers for gypsum boards; and woven fabrics and nonwoven fabrics made of fibers such as silk, cotton, hemp, polyester resin fibers, acrylic resin fibers, glass fibers, and carbon fibers. A resin such as an acrylic resin, a styrene-butadiene rubber, a melamine resin, or an urethane resin may be further added to the paper in order to increase the strength between fibers of a paper substrate or to prevent the paper substrate from fluffing. Examples of the paper to which the resin is added include interlayer reinforced papers and resin-impregnated papers.

Examples of the substrate in which a resin layer is laminated on a fibrous material layer include a wallpaper roll in which a resin layer such as a vinyl chloride resin layer, an olefin resin layer, or an acrylic resin layer is laminated on the surface of backing paper for wallpaper.

Examples of the substrate of the woody material include a wood substrate made of wood such as Japanese cedar, Japanese cypress, pine, zelkova, oak, live oak, walnut, lauan, teak, or a rubber tree. The wood substrate may be plate-shaped. The wood substrate may be a sliced veneer, a veneer, plywood, a laminated wood, a particleboard, a fiberboard, or the like.

The substrate may include an additive as desired. When the material constituting the substrate is a resin, examples of the additive include inorganic fillers such as calcium carbonate and clay, a flame retardant such as magnesium hydroxide, an antioxidant, a lubricant, a foaming agent, an ultraviolet absorber, and a light stabilizer. The content of the additive is not particularly limited as long as it is in a range that does not impair processing characteristics or the like. The content of the additive is appropriately set in accordance with required characteristics or the like.

The shape and dimensions of the substrate are not particularly limited. The shape and dimensions of the substrate may be appropriately selected in accordance with the application, and the desired various properties and processing suitability.

When the substrate is a flat plate such as a film, a sheet, or a plate, the thickness of the substrate is not particularly limited. In general, the thickness may be about 10 μm or more and about 10 cm or less from the viewpoints of production processing suitability, mechanical strength, handleability in use, and economic efficiency. When the substrate is a film or a sheet, the thickness of the substrate may be about 20 μm or more and about 300 μm or less. When the substrate is a plate, the thickness of the substrate may be about 1 mm or more and about 2 cm or less.

In order to improve the adhesion between the substrate and another layer constituting the decorative sheet or the decorative member, one or both surfaces of the substrate may be subjected to a physical surface treatment such as an oxidation process or a roughening process, or a surface treatment such as a chemical surface treatment. Examples of the oxidation process include a corona discharge treatment, a chromium oxidation treatment, a flame treatment, a hot air treatment, and an ozone-ultraviolet treatment. Examples of the roughening process include a sandblast process and a solvent treatment process. Any one of these surface treatments is appropriately selected in accordance with the type of the substrate. In general, the corona discharge treatment process is preferred in view of the effect of the surface treatment and operability.

<<Design Layer>>

The decorative sheet 20 may include a design layer 40 in order to improve design properties. From the viewpoint of enhancing weather resistance of the design layer 40, the design layer 40 may be disposed near the substrate 30. The design layer 40 may be disposed between the substrate 30 and the raised layer 50. When a primer layer (described later) is provided between the substrate 30 and the raised layer 50, the design layer 40 may be located between the substrate 30 and the primer layer. The substrate 30 may be located in the entire region of the decorative sheet 20 or may be located in only a partial region of the decorative sheet 20.

Examples of the design layer 40 include a colored layer formed by uniformly applying a monochrome ink; a picture layer formed by printing with an ink as a pattern; and a metallic thin film.

Examples of the picture (pattern) expressed by the design layer 40 include a woodgrain pattern such as annual rings or vessel grooves (vessel channels region) of the surface of a wood plate; a stone-grain pattern of the surface of a stone plate such as marble or granite; a fabric-grain pattern of the surface of a fabric; a leather-grain pattern of the surface of a leather; a tiling pattern including joint grooves; a brickwork pattern including joint grooves; a sand-grain pattern; a satin pattern; a pattern formed by arranging a plurality of protruded threads and depressed threads extending in directions parallel to each other (so-called "striped uneven pattern" or "light engraved pattern"); and an abstract pattern such as a geometric pattern, a character, a figure, polka dots, or a flower pattern.

The ink used for the colored layer and the picture layer may be an ink in which a colorant such as a pigment or a dye, an extender pigment, a solvent, a stabilizer, a plasticizer, a catalyst, a curing agent, an ultraviolet absorber, a light stabilizer, or the like is appropriately mixed with a binder resin.

The binder resin of the colored layer and the picture layer is not particularly limited. Examples of the binder resin of the colored layer and the picture layer include resins such as urethane resins, acrylic polyol resins, acrylic resins, ester resins, amide resins, butyral resins, styrene resins, urethane-acrylic copolymers, vinyl chloride-vinyl acetate copolymer resins, vinyl chloride-vinyl acetate-acrylic copolymer resins, chlorinated propylene resins, nitrocellulose resins, and cellulose acetate resins. Various types of resins such as one-part curing type resins and two-part curing type resins accompanied by a curing agent, for example, an isocyanate compound may be used.

The colorant is not particularly limited. Examples of the colorant include inorganic pigments such as carbon black (Indian ink), iron black, titanium white, antimony white, chrome yellow, titanium yellow, red iron oxide, cadmium red, ultramarine blue, and cobalt blue; organic pigments and dyes such as quinacridone red, isoindolinone yellow, nickel azo complex, phthalocyanin blue, and azomethine azo black; metallic pigments made of flake foil pieces of aluminum, brass, or the like; and pearlescent (pearl) pigments made of flake foil pieces of titanium dioxide-coated mica, basic lead carbonate, or the like.

The content of the colorant is not particularly limited. The content of the colorant may be adjusted in accordance with the picture, the color, and the concentration of the decorative layer and the material of the colorant. That is, the content of the colorant may be freely selected in an appropriate amount in consideration of the above-described factors. The content of the colorant may be, for example, 20 parts by mass or more and 500 parts by mass or less, 50 parts by mass or more and 300 parts by mass or less, or 70 parts by mass or more and 200 parts by mass or less with respect to 100 parts by mass of the resin constituting the colored layer and the picture layer.

The colored layer and the picture layer may include an additive such as an ultraviolet absorber, a light stabilizer, or a colorant. The thicknesses of the colored layer and the picture layer can be appropriately selected in accordance with a desired picture. The thicknesses of the colored layer and the picture layer may be selected from the viewpoint of concealing the ground color of the support member 15 and improving design properties. The thicknesses of the colored layer and the picture layer may be 0.5 µm or more and 20 µm or less, 1 µm or more and 10 µm or less, or 2 µm or more and 5 µm or less.

Examples of the metallic thin film include a thin film of a simple metallic element such as gold, silver, copper, tin, iron, nickel, chromium, or cobalt; and a thin film of an alloy including two kinds or more of the metallic elements. Examples of the alloy include brass, bronze, and stainless steel.

The film thickness of the metallic thin film can be about 0.1 µm or more and about 1 µm or less.

<Raised Layer>

The raised layer 50 reduces gloss. The raised layer 50 functions as a matte layer. The raised layer 50 imparts a tactile sensation. The raised layer 50 includes a raised portion 55 provided in a region overlapping a partial region of the design layer 40. As illustrated in FIG. 2, the raised layer 50 may include a plurality of raised portions 55 spaced apart from one another. The raised layer 50 may include one raised portion 55.

When the raised portion 55 is partially located on or above the design layer 40, the decorative sheet 20 includes a region including the raised portion 55 and a region not including the raised portion 55. Accordingly, a gloss contrast can be formed, and a visually perceivable stereoscopic effect can be imparted. The region including the raised portion 55 tends to be observed as more depressed than the region not including the raised portion 55.

The proportion of the area where the raised portion 55 is provided to the total area of the design layer 40 is preferably 5% or more and less than 100%, more preferably 10% or more and 90% or less, further preferably 15% or more and 80% or less, and still further preferably 30% or more and 70% or less.

When the raised portion 55 is located in a partial region of the total area of the design layer 40, that is, when the proportion of the area where the raised portion 55 is provided to the total area of the design layer 40 is less than 100%, the arrangement of the raised portion 55 may be determined in accordance with the design imparted by the decorative sheet 20.

For example, when the decorative sheet 20 expresses the "woodgrain pattern" of a natural wood plate as illustrated in FIG. 1, the matte layer (raised layer) may be disposed at an appropriate position on or above the decorative sheet in consideration of factors constituting the woodgrain pattern such as the tree type of wood, the type of woodgrain (flat grain or edge grain; presence of a burl grain; presence of vessel grooves (vessel channels), or the like), and the processing state of the wood plate (planing treatment, brushing treatment to provide feeling, or the like).

In the case of a woodgrain pattern having vessel grooves (vessel channels), the raised portion 55 may be disposed in both a vessel groove region (vessel channels region) and a non-vessel groove region (non-vessel channels region). The raised portion 55 may be disposed only in the vessel groove region. The raised portion 55 may be disposed only in the non-vessel groove region. It is preferable to arrange the raised portion 55 in the non-vessel groove region in order to reproduce the appearance and tactile sensation of a natural wood plate.

In the case of a brushed wood plate (relief tone wood plate), the raised portion 55 may be disposed in both an early wood region 33A and a late wood region 33B. The raised portion 55 may be disposed only in the early wood region 33A. The raised portion 55 may be disposed only in the late wood region 33B. It is preferable to arrange the raised portion 55 in the early wood region 33A in order to reproduce the appearance and tactile sensation of the brushed wood plate.

In a woodgrain having a node, the raised portion 55 may be disposed only in a portion of a node 33C. The raised portion 55 may be disposed only in a portion other than the node 33C.

The raised portion 55 includes a binder resin 60, resin particles 61, and inorganic particles 62. The thickness of the raised portion 55 is partially different. Since the raised portion 55 has the above-described configuration, the decorative sheet 20 can be imparted with both a tactile sensation and low gloss.

In contrast, when the raised portion 55 does not have the above-described configuration, both the tactile sensation and the low gloss cannot be attained for the following reason.

First, when the raised portion 55 does not include the inorganic particles 62 and includes only the resin particles 61, the gloss of the decorative sheet 20 cannot be reduced.

When the raised portion 55 does not include the resin particles 61 and includes only the inorganic particles 62, the raised portion 55 is whitened, the visibility of the design layer 40 is deteriorated, and the design properties of the decorative sheet 20 are deteriorated. When the raised portion 55 does not include the resin particles 61 and includes only the inorganic particles 62, the gloss of the raised portion 55 is extremely reduced, and the raised portion 55 may lack a natural feeling. The inorganic particles 62 have lower adhesion to the binder resin 60 than the resin particles 61, and hence the inorganic particles 62 are more likely to fall off from the raised portion 55 than the resin particles 61. The inorganic particles 62 having a large particle size are more likely to fall off from the raised portion 55. Thus, when the raised portion 55 does not include the resin particles 61 and includes only the inorganic particles 62, a defect due to falling off of the inorganic particles 62 is likely to occur. The difference between the refractive index of the binder resin 60 and the refractive index of the inorganic particles 62 is relatively large, and hence, when the inorganic particles 62 fall off from the raised portion 55, the gloss is greatly changed.

Although the raised portion 55 includes the resin particles 61 and the inorganic particles 62, when the thickness of the raised portion 55 is not partially different, a sufficient tactile sensation cannot be imparted.

When the raised portion 55 includes only the inorganic particles 62, it is difficult to attain both the tactile sensation and the low gloss for the following reason.

The inorganic particles 62 such as silica to be blended in the ink are usually produced by a method of increasing the particle size by synthesis. In the production method by synthesis described above, particles having uniform particle sizes to some extent can be produced; however, the maximum particle size is only about 18 μm, and it is difficult to produce the inorganic particles 62 having a large particle size. As described above, it is difficult to obtain the inorganic particles 62 having a large particle size capable of improving the tactile sensation.

As a method of producing the inorganic particles 62 such as silica, there is a method of producing the inorganic particles 62 by pulverizing a lump of large inorganic particles 62. In the above-described production method by pulverization, the inorganic particles 62 having a large particle size are obtained, but the distribution of the particle sizes becomes very wide as several tens of micrometers or more and several hundreds of micrometers or less. Thus, properties such as a tactile sensation and low gloss are not stable, and such inorganic particles 62 are not appropriate as an additive to be blended in the ink.

<<Binder Resin>>

Examples of the binder resin 60 include a thermoplastic resin and a cured product of a curable resin composition. From the viewpoint of scratch resistance, the cured product of the curable resin composition is preferable as the binder resin 60. That is, the binder resin may include the cured product of the curable resin composition. The proportion of the cured product of the curable resin composition to the total amount of the binder resin is preferably 50% by mass or more, more preferably 70% by mass or more, further preferably 90% by mass or more, and still further preferably 100% by mass.

Examples of the thermoplastic resin include acrylic-based resins, cellulose-based resins, urethane-based resins, vinyl chloride-based resins, polyester-based resins, polyolefin-based resins, polycarbonate, nylon, polystyrene, and ABS resins.

Examples of the cured product of the curable resin composition include a cured product of a thermosetting resin composition and a cured product of an ionizing radiation-curable resin composition. The cured product of the thermosetting resin composition is preferable in terms of surface properties such as scratch resistance and stain resistance. The cured product of the ionizing radiation-curable resin composition is excellent in surface properties such as scratch resistance and stain resistance, and further excellent in maintenance of the properties over time.

The thermosetting resin composition is a composition including at least a thermosetting resin and is a resin composition that is cured by heating.

Examples of the thermosetting resin include acrylic resins, urethane resins, phenol resins, urea-melamine resins, epoxy resins, unsaturated polyester resins, and silicone resins. In addition to these thermosetting resins, a curing agent, a curing catalyst, and the like may be added to the thermosetting resin composition.

Among the examples of the thermosetting resin composition, a two-part curing composition including a polyol-based resin as a main agent and an isocyanate-based compound as a curing agent is preferable. Examples of the polyol-based resin include an acrylic polyol and a polyester polyol.

The ionizing radiation-curable resin composition may be an electron beam-curable resin composition or an ultraviolet curable resin composition. The electron beam-curable resin composition is preferable because it does not require a polymerization initiator, and hence has little odor and is less likely to be colored. When the raised portion 55 contains an ultraviolet absorber (described later), the electron beam-curable resin composition is likely to increase the crosslinking density of the raised portion 55 and to improve the scratch resistance and the stain resistance.

The ionizing radiation-curable resin composition is a composition including a compound having an ionizing radiation-curable functional group (hereinafter, also referred to as "ionizing radiation-curable compound").

The ionizing radiation-curable functional group is a group that is crosslinked and cured by irradiation with ionizing radiation. Examples of the ionizing radiation-curable functional group include functional groups having an ethylenic double bond, such as a (meth)acryloyl group, a vinyl group, and an allyl group. Examples of the ionizing radiation-curable functional group also include an epoxy group and an oxetanyl group.

In the present description, (meth)acryloyl group refers to acryloyl group or methacryloyl group. In the present description, (meth)acrylate refers to acrylate or methacrylate. Ionizing radiation refers to electromagnetic waves or charged particle beams having energy quanta capable of polymerizing or crosslinking molecules. The ionizing radiation may use ultraviolet (UV) rays or electron beams (EB). The ionizing radiation includes electromagnetic waves such as X-rays and γ-rays, and charged particle beams such as α-rays and ion beams. Specifically, the ionizing radiation-curable compound may be appropriately selected from polymerizable monomers and polymerizable oligomers (also referred to as "polymerizable prepolymers") which are generally used as ionizing radiation-curable resins.

The ionizing radiation-curable compound is preferably a compound having two or more ethylenically unsaturated bond groups. The ionizing radiation-curable compound is more preferably a polyfunctional (meth)acrylate-based compound having two or more ethylenically unsaturated bond groups. The polyfunctional (meth)acrylate-based compound may be either a monomer or an oligomer.

Among polyfunctional (meth)acrylate-based compounds, examples of bifunctional (meth)acrylate-based monomers include ethylene glycol di(meth)acrylate, bisphenol A tetraethoxy diacrylate, bisphenol A tetrapropoxy diacrylate, and 1,6-hexanediol diacrylate.

Examples of (meth)acrylate-based monomers having three or more functional groups include trimethylolpropane tri(meth)acrylate, pentaerythritol tri(meth)acrylate, pentaerythritol tetra(meth)acrylate, dipentaerythritol hexa(meth)acrylate, dipentaerythritol tetra(meth)acrylate, and isocyanuric acid-modified tri(meth)acrylate.

Examples of polyfunctional (meth)acrylate-based oligomers include acrylate-based polymers such as urethane (meth)acrylate, epoxy (meth)acrylate, polyester (meth)acrylate, and polyether (meth)acrylate.

The urethane (meth)acrylate is obtained, for example, by a reaction of a polyhydric alcohol and an organic diisocyanate with a hydroxy (meth)acrylate.

Preferred epoxy (meth)acrylates are a (meth)acrylate obtained by allowing an aromatic epoxy resin, an alicyclic epoxy resin, or an aliphatic epoxy resin having three or more functional groups to react with a (meth)acrylic acid; a (meth)acrylate obtained by allowing an aromatic epoxy resin, an alicyclic epoxy resin, or an aliphatic epoxy resin having two or more functional groups to react with a polybasic acid and a (meth)acrylic acid; and a (meth)acrylate obtained by allowing an aromatic epoxy resin, an alicyclic epoxy resin, or an aliphatic epoxy resin having two or more functional groups to react with phenols and a (meth)acrylic acid.

The ionizing radiation-curable resin may be used singly or in combination of two or more kinds thereof.

When the ionizing radiation-curable compound is an ultraviolet-curable compound, the ionizing radiation-curable resin composition may include an additive such as a photopolymerization initiator or a photopolymerization accelerator.

Examples of the photopolymerization initiator include one or more kinds selected from acetophenone, benzophenone, α-hydroxyalkylphenone, Michler's ketone, benzoin, benzyl dimethyl ketal, benzoyl benzoate, α-acyloxime ester, and thioxanthones.

The photopolymerization accelerator can reduce polymerization inhibition by air at the time of curing and increase the curing rate. Examples of the photopolymerization accelerator include one or more kinds selected from p-dimethylaminobenzoic acid isoamyl esters and p-dimethylaminobenzoic acid ethyl esters.

<<Resin Particles>>

Examples of the resin particles 61 include particles formed from one or more kinds of resins such as polymethyl methacrylates, polyacrylic-styrene copolymers, melamine resins, polycarbonate, polystyrene, polyvinyl chloride, benzoguanamine-melamine-formaldehyde condensates, silicone resins, fluorine-based resins, and polyester-based resins. Among them, polymethyl methacrylate particles are preferable. The resin particles 61 may be spherical.

When the average particle size of the resin particles is defined as D1, the D1 is preferably 20 μm or more and 70 μm or less, more preferably 25 μm or more and 65 μm or less, and further preferably 30 μm or more and 60 μm or less.

By setting the D1 to 20 μm or more, the tactile sensation can be improved. By setting the D1 to 20 μm or more, the relationship D2<D1 is likely to be satisfied. Accordingly, the thickness of the raised portion 55 is partially different, and a complex tactile sensation can be imparted.

By setting the D1 to 70 μm or less, falling off of the resin particles 61 from the raised portion 55 can be easily suppressed.

The number proportion of the resin particles having particle sizes within ±20 μm of the average particle size to all the resin particles 61 is preferably 70% or more, more preferably 80% or more, further preferably 90% or more, and still further preferably 95% or more.

The particle size (μm) of the resin particles is defined as the maximum width, that is, the maximum length of the resin particles in plan view of the decorative sheet. As illustrated in FIG. 2, the particle size (μm) of the resin particles is defined as the maximum width, that is, the maximum length, of the resin particles when the decorative sheet is observed in the normal direction D3 in an enlarged manner. The average particle size (μm) of the resin particles is specified by observing 10 regions having an area of 1000 μm×1000 μm of the decorative sheet in the normal direction of the decorative sheet in an enlarged manner, measuring the particle sizes of three resin particles in the order from larger one in each region, and obtaining the average value (μm) of the particle sizes of 30 resin particles measured from the 10 regions.

The content of the resin particles 61 is preferably 5 parts by mass or more and 35 parts by mass or less, more preferably 10 parts by mass or more and 30 parts by mass or less, and further preferably 15 parts by mass or more and 25 parts by mass or less with respect to 100 parts by mass of the binder resin. By setting the content of the resin particles 61 to 5 parts by mass or more, the tactile sensation due to the resin particles 61 can be emphasized. By setting the content of the resin particles 61 to 35 parts by mass or less, an increase in gloss due to the resin particles 61 can be suppressed, and a natural feeling can be imparted to the decorative sheet 20.

<<Inorganic Particles>>

The inorganic particles 62 may be particles formed of one or more kinds of inorganic substances such as silica, alumina, zirconia, and titania. Among them, silica is preferable as the material of the inorganic particles 62. The inorganic particles may be spherical or amorphous.

When the average particle size of the inorganic particles is defined as D2, the D2 is preferably 5 μm or more and 20 μm or less, more preferably 7 μm or more and 17 μm or less, and further preferably 10 μm or more and 15 μm or less. By setting the D2 to 5 μm or more, the gloss can be reduced. By setting the D2 to 20 μm or less, the relationship D2<D1 is likely to be satisfied. Accordingly, the thickness of the raised portion 55 is partially different, and a complex tactile sensation can be imparted.

The proportion of the inorganic particles 62 larger than the average particle size by 20 μm or more to all the inorganic particles 62 is preferably 30% or less, more preferably 20% or less, further preferably 10% or less, and still further preferably 5% or less.

The particle size (μm) of the inorganic particles is defined as the maximum width, that is, the maximum length, of the inorganic particles in the longitudinal section of the decorative sheet. That is, as illustrated in FIGS. 3 and 4, the particle size (μm) of the inorganic particles is defined as the maximum width, that is, the maximum length, of the inorganic particles in the section in the normal direction D3 of the decorative sheet. The average particle size (μm) of the inorganic particles is specified by observing 30 sectional regions having a length of 1000 μm in a direction orthogonal to the normal direction of the decorative sheet in an enlarged manner, measuring the particle size of one largest inorganic particle in each sectional region, and obtaining the average value (μm) of the particle sizes of the measured 30 inorganic particles.

The content of the inorganic particles 62 is preferably 4 parts by mass or more and 30 parts by mass or less, more preferably 7 parts by mass or more and 25 parts by mass or less, and further preferably 10 parts by mass or more and 20 parts by mass or less with respect to 100 parts by mass of the binder resin. By setting the content of the inorganic particles 62 to 4 parts by mass or more, the gloss can be reduced. By setting the content of the inorganic particles 62 to 30 parts by mass or less, a decrease in visibility due to whitening of the matte layer can be suppressed, and a decrease in natural feeling due to an extreme decrease in gloss of the raised portion 55 can be suppressed.

<<Relationship among Resin Particles, Inorganic Particles, and Binder Resin>>

The D1 indicating the average particle size of the resin particles and the D2 indicating the average particle size of the inorganic particles satisfy D2<D1. The raised portion 55 includes protrusions 56 formed by protrusion of the inorganic particles 62. In this case, "protrusion of inorganic particles" means that, as illustrated in FIG. 4, at least one inorganic particle 62A protrudes in the third direction D3 more than the minimum thickness TA of the raised portion 55 located between the inorganic particle 62A and another adjacent inorganic particle 62B. That is, at least one portion of the inorganic particle 62A is located on the first side in the third direction D3 with respect to the position at which the minimum thickness TA of the raised portion 55 is obtained, and is located away from the design layer 40 in the third direction D3 in the illustrated example. In the illustrated example, a depression 57 is formed between the inorganic particle 62A and the inorganic particle 62B. The top of the inorganic particle 62A is located on the first side in the third direction D3 with respect to the position of the depression 57 having the minimum thickness TA. The top of the inorganic particle 62B is located on the first side in the third direction D3 with respect to the position of the depression 57 having the minimum thickness TA.

With the configuration, the thickness of one portion of the raised portion 55 can be set to a thickness corresponding to the particle size of the resin particles 61, and the thickness of another portion of the raised portion 55 can be set to a thickness corresponding to the particle size of the inorganic particles 62. As a result, as illustrated in FIG. 3, the decorative sheet 20 includes a region RX where the raised portion 55 is not provided, a region RZ where the resin particles 61 of the raised portion 55 protrude, and a region RY where the thickness is set by the inorganic particles 62 of the raised portion 55. In the illustrated example, the thickness of the region of the raised portion 55 where the resin particles 61 are not present is similar to the particle size of the inorganic particles 62. The decorative sheet 20 has mutually different heights in the three regions RX, RY, and RZ. When the decorative sheet 20 is touched, a strong tactile sensation is imparted from the resin particles 61 in the region RZ. In the region RY where the thickness is determined by the inorganic particles 62, a strong tactile sensation due to the presence of the inorganic particles 62 is imparted. As a result, the three regions having mutually different heights can be clearly perceived via the sense of touch. In addition, in the region RY, the tops of the protrusions 56 are dispersed at a higher density than the resin particles 61. A complex tactile sensation can be expressed by the tops of the dispersed protrusions 56. Accordingly, a strong tactile sensation can be imparted with rich expression.

The surfaces of the inorganic particles 62 have low gloss. In the region RY where the thickness is determined by the inorganic particles 62, the inorganic particles 62 protrude from the binder resin 60 and are exposed from the binder resin 60. Alternatively, the inorganic particles 62 are located in the vicinity of the surface of the raised portion 55. Thus, the gloss of the raised portion 55 can be sufficiently reduced. FIG. 2 illustrates only the inorganic particles 62 exposed from the binder resin 60.

The resin particles 61 protrude from the binder resin 60. As illustrated in FIG. 3, the tops of the resin particles 61 may be covered with the binder resin 60 or may be exposed from the binder resin 60.

As described above, an excellent tactile sensation can be imparted to the decorative sheet 20, and the gloss of the decorative sheet 20 can be reduced. That is, various tactile sensations can be imparted in an emphasized manner, and the gloss is reduced. Thus, with the decorative sheet 20, an artificial impression can be weakened and a natural feeling can be created. Due to the tactile sensation and the low gloss of the decorative sheet 20, the surface of a complex natural object such as a surface of a tree or a surface of a stone can be expressed with high fidelity. The raised layer 50 is suitable for combination with the design layer 40 displaying a natural object.

The inorganic particles 62 have lower adhesion to the binder resin 60 than the resin particles 61. Thus, the inorganic particles 62 are more likely to fall off from the raised portion 55 than the resin particles 61. When the average particle size of the inorganic particles 62 is larger than the average particle size of the resin particles 61, that is, when D1<D2, the inorganic particles 62 are likely to fall off from the raised portion 55. In contrast, when D2<D1, falling off of the inorganic particles 62 from the raised portion 55 can be suppressed. By setting D2<D1, a configuration in which the thickness of the raised portion 55 is partially different can be easily implemented.

The following configuration may be employed in order to enhance the effect of attaining both the tactile sensation and the low gloss.

The average particle size of the resin particles 61 may be larger than the average thickness of the raised portion 55. With this example, the thickness of the raised portion 55 at the region RZ where the resin particles 61 are present is significantly different from the thickness of the raised portion 55 in the region RY where the inorganic particles 62 are present. Accordingly, the tactile sensation imparted by the resin particles 61 and the tactile sensation imparted by the inorganic particles 62 can be made significantly different from each other. Accordingly, a more complex tactile sensation can be imparted by the raised layer 50.

The average particle size D2 of the inorganic particles 62 may be larger than a half of an average thickness T of the raised portion 55. That is, the relationship of T/2<D2 may be established. With this example, the thickness of the raised portion 55 is not excessively large with respect to the particle size of the inorganic particles 62. As illustrated in FIG. 3, the thickness of the region of the raised portion 55 where the resin particles 61 are not present can be similar to the particle size of the inorganic particles 62. Thus, arrangement of the inorganic particles 62 in the third direction D3 can be suppressed in the raised portion 55. As a result, in the region RY of the raised portion 55 where the resin particles 61 are not present, the tendency that the thickness of the raised portion 55 becomes the thickness corresponding to the particle size of the inorganic particles 62 is increased. Accordingly, in the region RY, the inorganic particles 62 are exposed from the surface of the raised portion 55, or the inorganic particles 62 are located in the vicinity of the surface of the raised portion 55. As a result, the tactile sensation in the region RY can be emphasized, and the gloss can be effectively reduced. An area in which the inorganic particles 62 are in contact with the binder resin 60 is increased, and hence falling off of the inorganic particles 62 from the binder resin 60 can be effectively suppressed.

The thickness (μm) of the raised portion is the length (μm) of the raised portion in the normal direction of the decorative sheet. The average thickness (μm) of the raised portion is defined as the average value (μm) of thicknesses at 30 locations measured at intervals of 100 μm in a direction orthogonal to the normal direction in a longitudinal section of the decorative sheet, that is, a section in the normal direction of the decorative sheet.

As illustrated in FIG. 4, the raised portion 55 may have a depression 57 between two protrusions 56A and 56B. The protrusion 56A is one protrusion formed by protrusion of one inorganic particle 62A. The protrusion 56B is another protrusion formed by protrusion of another inorganic particle 62B. The one inorganic particle 62A and the other inorganic particle 62B are adjacent to each other in a direction orthogonal to the third direction D3, that is, in the first direction D1 in the illustrated example. In this example, the thickness TA of the raised portion 55 in at least one depression 57B may be smaller than the average thickness T of the raised portion 55. The thickness TA of the raised portion 55 in the at least one depression 57B may be smaller than a particle size D2A of the one inorganic particle 62A or may be smaller than a particle size D2B of the other inorganic particle 62B. The thickness TA of the raised portion 55 in the at least one depression 57B may be smaller than the average particle size D2 of the inorganic particles 62. In any one of these examples, in the region RY of the raised portion 55 where the resin particles 61 are not present, the inorganic particles 62 are exposed from the surface of the raised portion 55 or the inorganic particles 62 are located in the vicinity of the surface of the raised portion 55. As a result, the tactile sensation in the region RY can be emphasized, and the gloss can be effectively reduced.

As illustrated in FIG. 4, the tops of at least part of inorganic particles 62 may be exposed from the binder resin 60. The inorganic particles 62A can effectively reduce the gloss of the decorative sheet.

The difference between the D1 and the D2 may be within a predetermined range in order to easily attain both the tactile sensation and the low gloss feeling. Specifically, D1−D2 is preferably 15 μm or more and 60 μm or less, more preferably 25 μm or more and 50 μm or less, and further preferably 30 μm or more and 45 μm or less.

The average particle size of the resin particles 61 may be larger than twice the average particle size of the inorganic particles 62. With this example, the difference between the particle size of the resin particles 61 and the particle size of the inorganic particles 62 can be increased. Then, two peaks can be given to the particle size distribution of the particles 61 and 62 included in the raised portion 55. Accordingly, the tactile sensation caused by the resin particles 61 and the tactile sensation caused by the inorganic particles 62 can be made significantly different from each other. Accordingly, a complex tactile sensation can be imparted to the decorative sheet 20. The average particle size of the resin particles 61 may be five times or less of the average particle size of the inorganic particles 62. By setting the upper limit to the difference between the average particle size of the resin particles 61 and the average particle size of the inorganic particles 62, both the resin particles 61 and the inorganic particles 62 are less likely to fall off from the binder resin 60.

The average thickness of the raised portion 55 at a position at which the resin particles 61 are not present may be 80% or more and 130% or less, 85% or more and 125% or less, or 90% or more and 120% or less of the average particle size of the inorganic particles 62. With this example, the thickness of the raised portion 55 is not excessively large with respect to the particle size of the inorganic particles 62. Thus, arrangement of the inorganic particles 62 in the third direction D3 can be suppressed in the raised portion 55. As a result, in the region RY of the raised portion 55 where the resin particles 61 are not present, the tendency that the thickness of the raised portion 55 becomes the thickness corresponding to the particle size of the inorganic particles 62 is increased. Accordingly, in the region RY, the inorganic particles 62 are exposed from the surface of the raised portion 55, or the inorganic particles 62 are located in the vicinity of the surface of the raised portion 55. As a result, the tactile sensation in the region RY can be emphasized, and the gloss can be effectively reduced.

The average thickness (μm) at a position of the raised portion where the resin particles 61 are not present is defined as the average value (μm) of measured values at measurement positions where the resin particles 61 are not present among thicknesses (μm) measured at 30 positions at intervals of 100 μm in a direction orthogonal to the normal direction in a longitudinal section of the decorative sheet.

The resin particles and the inorganic particles are preferably used at a predetermined ratio in order to attain both the tactile sensation and the low gloss. Specifically, the content of the inorganic particles is preferably 40 parts by mass or more and 200 parts by mass or less, more preferably 50 parts by mass or more and 150 parts by mass or less, and further preferably 60 parts by mass or more and 90 parts by mass or less with respect to 100 parts by mass of the resin particles.

<<Thickness>>

The thickness of the raised layer 50 may be partially different. By the thickness of the raised portion 55 being partially different, the tactile sensation can be emphasized. In order to make the thickness of the raised portion 55 partially different, it is preferable that the raised portion 55 includes particles having different particle sizes.

By forming the raised layer 50 by gravure printing using a gravure plate having partially different plate depths, the thickness of the raised portion 55 can be made partially different, and the tactile sensation can be enhanced. The gravure plate has a large number of independent cells on the surface thereof. In the gravure plate having partially different plate depths, the depth of some cells is different from the depth of other cells. For example, the small-depth cell may preferably have a depth of 5 μm or more and 40 μm or less, and more preferably a depth of 10 μm or more and 30 μm or less. The large-depth cell may preferably have a depth of 40 μm or more and 150 μm or less, and more preferably a depth of 60 μm or more and 120 μm or less.

In the gravure plate having partially different plate depths, a portion having a large plate depth is filled with a large amount of an ink for a matte layer. A portion having a small plate depth is filled with a small amount of the ink for a matte layer. Thus, the raised portion 55 having a partially different thickness can be formed by gravure printing using the gravure plate having the partially different plate depths.

In the gravure plate having the partially different plate depths, the portion having the large plate depth is likely to be filled with the resin particles having the large average particle size. The portion having the small plate depth is likely to be filled with the inorganic particles having the small average particle size. By using the gravure plate having the partially different plate depths, the thickness of the raised portion 55 can be made different not only by the difference in the filling amount of the ink but also by the difference in the filled particles. The sizes of the individual cells of the gravure plate are too small to be easily recognized by humans. Similarly, the spacing between the cells is too short to be easily recognized by humans. The ink is leveled after gravure printing, and hence the print regions of adjacent cells may be connected to each other. Thus, when the raised layer 50 is formed by the gravure plate having the partially different plate depths, the raised layer 50 as a whole can attain both the tactile sensation and the low gloss. When the raised portions 55 are spaced apart from one another as illustrated in FIGS. 2 and 3, each raised portion 55 can attain both the tactile sensation and the low gloss.

The raised layer 50 preferably satisfies (1) and (2) below when a region where the raised portion 55 has a thickness of more than 6 µm and 20 µm or less is defined as R1 and a region where the raised portion 55 has a thickness of more than 20 µm and 55 µm or less is defined as R2.

(1) The proportion of the R1 to the total area of the region where the raised portion 55 is provided is 35% or more and 55% or less.

(2) The proportion of the R2 to the total area of the region where the raised portion 55 is provided is 20% or more and 40% or less.

By satisfying the above-described (1) and (2), uniformization of the tactile sensation and the gloss in the plane of the raised layer 50 can be suppressed. When the tactile sensation in the plane of the raised layer 50 is made uniform, the impression of an artificial object may be provided, or the tactile sensation itself may be deteriorated due to less protrusions and depressions. When the gloss in the plane of the raised layer 50 is made uniform, the impression of an artificial object becomes strong, and it is difficult to express the appearance of a natural object such as natural wood. Thus, by satisfying the above-described (1) and (2), the tactile sensation can be further emphasized and the feeling of a natural object can be enhanced.

The raised layer 50 further preferably satisfies (3) and (4) below when a region where the raised portion 55 has a thickness of 6 µm or less is defined as R0 and a region where the raised portion 55 has a thickness of more than 55 µm is defined as R3.

(3) The proportion of the R0 to the total area of the region where the raised portion 55 is provided is 20% or less.

(4) The proportion of the R3 to the total area of the region where the raised portion 55 is provided is 5% or less.

By satisfying the above-described (3), the gloss can be effectively reduced. By satisfying the above-described (4), a decrease in tactile sensation due to the presence of an extremely thick region can be suppressed.

The thickness of each portion of the raised portion 55 can be measured from, for example, a sectional photograph of the decorative sheet.

The distribution of the thicknesses of the raised portion 55 can be calculated by, for example, steps (X1) to (X3) below. The area ratios of the above-described R0, R1, R2, and R3 can also be calculated from the thicknesses obtained in steps (X1) to (X3) below.

(X1) 10 sectional photographs are prepared in which the widths of the raised portion 55 in a range of 500 µm or more and 1500 µm or less are image-captured.

(X2) In each sectional photograph, the thicknesses of the raised portion 55 are calculated every 5 µm in the width direction of the matte layer. (When the width of the raised portion 55 in each sectional photograph is 500 µm, the thickness of the raised matte layer is calculated at 100 locations in each sectional photograph.)

(X3) The distribution of the thicknesses of the raised portion 55 is calculated based on data in which all the thicknesses are calculated from the 10 sectional photographs.

The average thickness of the raised portion 55 is preferably 10 µm or more and 70 µm or less, more preferably 12 µm or more and 60 µm or less, and further preferably 15 µm or more and 50 µm or less.

The raised portion 55 may include an additive as desired. Examples of the additive include an antioxidant, an ultraviolet absorber, a light stabilizer, and a leveling agent.

The raised layer 50 can be fabricated by, for example, applying, drying, and curing an ink for a raised layer including materials (a binder resin, resin particles, inorganic particles, and the like) constituting the raised portion 55, and a solvent or the like added as desired on the design layer 40.

<Other Layers>

The decorative sheet 20 may include a layer other than the substrate 30, the design layer 40, and the raised layer 50. Examples of the other layers include a primer layer, a surface protective layer, and an adhesive layer.

<<Primer Layer>>

The decorative sheet 20 may include a primer layer for the purpose of improving adhesion.

The primer layer mainly consists of a binder resin. The primer layer may include an additive such as an ultraviolet absorber or a light stabilizer as desired.

Examples of the binder resin include urethane resins, acrylic polyol resins, acrylic resins, ester resins, amide resins, butyral resins, styrene resins, urethane-acrylic copolymers, polycarbonate-based urethane-acrylic copolymers (urethane-acrylic copolymers derived from a polymer (polycarbonate polyol) having a carbonate bond on a polymer principal chain and two or more hydroxyl groups on a terminal and a side chain), vinyl chloride-vinyl acetate copolymer resins, vinyl chloride-vinyl acetate-acrylic copolymer resins, chlorinated propylene resins, nitrocellulose resins (nitrocellulose), and cellulose acetate resins. The binder resin may include one kind of these resins or a plurality of kinds of these resins. The binder resin may be a resin obtained by adding a curing agent such as an isocyanate-based curing agent or an epoxy-based curing agent to such a resin and crosslinking and curing the resin. As a specific example, the binder resin may be obtained by crosslinking and curing a polyol-based resin such as an acrylic polyol resin with an isocyanate-based curing agent, or may be obtained by crosslinking and curing an acrylic polyol resin with an isocyanate-based curing agent.

The primer layer may include an ultraviolet absorber and/or a light stabilizer in order to further improve the weather resistance. The primer layer may include a general-purpose ultraviolet absorber or a general-purpose light stabilizer.

The thickness of the primer layer is preferably 0.01 µm or more and 10 µm or less, more preferably 0.7 µm or more and 8 µm or less, and further preferably 1.0 µm or more and 6 µm or less.

<<Surface Protective Layer>>

The decorative sheet 20 may include a surface protective layer on the side of the raised layer 50 opposite to the substrate.

By including the surface protective layer, durability of the decorative sheet 20 can be enhanced. The surface protective layer is preferably formed at least on or above the raised portion 55, and more preferably formed on the entire surface of the decorative sheet. That is, when the raised portion 55 is partially formed on or above the substrate 30, the surface protective layer is more preferably formed on both a portion where the raised portion 55 is present and a portion where the raised portion 55 is not present.

The surface protective layer may include a resin component as a main component. The main component means 50% by mass or more, and preferably 70% by mass or more of the total solid content of the surface protective layer.

The resin component of the surface protective layer is preferably a cured product of a curable resin composition. The proportion of the cured product of the curable resin composition to the total amount of the resin component is preferably 50% by mass or more, more preferably 70% by mass or more, further preferably 90% by mass or more, and still further preferably 100% by mass. The cured product of the curable resin composition constituting the surface protective layer may be the same as the cured product of the curable resin composition constituting the raised portion 55.

The surface protective layer may include an additive as desired. Examples of the additive include an antioxidant, an ultraviolet absorber, a light stabilizer, a matting agent, and a leveling agent.

The thickness of the surface protective layer is preferably 2 μm or more and 20 μm or less, more preferably 4 μm or more and 16 μm or less, and further preferably 5 μm or more and 12 μm or less.

<<Adhesive Layer>>

The decorative sheet 20 may include an adhesive layer on a side of the substrate 30 opposite to the raised layer 50. The decorative sheet 20 may be bonded to the support member 15 with an adhesive.

The adhesive used for the adhesive layer is not particularly limited. The adhesive used for the adhesive layer may be a known adhesive. The adhesive used for the adhesive layer may be, for example, an adhesive such as a heat-sensitive adhesive or a pressure-sensitive adhesive. Examples of the resin used for the adhesive constituting the adhesive layer include acrylic resins, polyurethane resins, vinyl chloride resins, vinyl acetate resins, vinyl chloride-vinyl acetate copolymer resins, styrene-acrylic copolymer resins, polyester resins, and polyamide resins. The material constituting the adhesive layer may include one kind of these materials or a plurality of kinds of these materials. The adhesive layer may be a two-part curing type polyurethane-based adhesive using an isocyanate compound or the like as a curing agent, or a polyester-based adhesive. The adhesive layer may be a pressure-sensitive adhesive. Examples of the pressure-sensitive adhesive include acrylic-based, urethane-based, silicone-based, and rubber-based pressure-sensitive adhesives.

The adhesive layer can be fabricated by applying and drying the above-described resin in a form capable of being applied such as a solution or an emulsion by a gravure printing method, a screen printing method, or a reverse coating method using a gravure plate.

The thickness of the adhesive layer is not particularly limited. From the viewpoint of obtaining excellent adhesiveness, the thickness of the adhesive layer may be 1 μm or more and 100 μm or less, 5 μm or more and 50 μm or less, or 10 μm or more and 30 μm or less.

Applications

The decorative member 100 and the decorative sheet 20 of the present disclosure can be used for various applications. Examples of specific applications include (1) to (9) below.

(1) A surface member of an interior material portion such as a wall, a floor, or a ceiling of a building, for example, a house, an office, a store, a hospital, or a clinic.

(2) A surface member of an exterior portion such as an exterior wall, a roof, an eave soffit, or a door pocket of a building, for example, a house, an office, a store, a hospital, or a clinic.

(3) A surface member (interior material portion or exterior material portion) of a fitting such as a window, a window frame, a door, or a door frame; a surface member of an accessory (handle or the like) of the fitting; and a surface member of a jig of the fitting.

(4) A surface member of an interior decoration or a fixture such as a handrail, a spandrel wall, a molding, a sill, a linte (Kamoi, a part that passes above a sliding door), or a coping.

(5) A surface member of an outdoor (exterior) portion such as a fence, a gate door, a pole of a clothes-drying rack, or a handrail.

(6) A surface member of furniture such as wardrobes, a desk, a chair, a cupboard, or a kitchen sink; a surface member of an accessory (a handle or the like) of the furniture; and a surface member of a jig of the furniture.

(7) A surface member of a housing or the like of any one of various home electric appliances such as a television receiver, a radio receiver, a refrigerator, a microwave oven, a washing machine, an electric fan, and an air conditioner; a surface member of an accessory (a handle, a switch, a touch panel, or the like) of the home electric appliance; and a surface member of a jig of the home electric appliance.

(8) A surface member of office automation equipment such as an electronic copying machine, a facsimile machine, a printer, or any one of various computer equipment, for example, a personal computer; a surface member of a housing of any one of various office automation equipment such as an ATM device in a financial institution, for example, a bank or a post office; a surface member of an accessory (a keyboard, a touch panel, or the like) of any one of the various office automation equipment; and a surface member of a jig of any one of the various office automation equipment.

(9) A surface member of an interior material portion or exterior material portion (a wall, a floor, a ceiling, a handrail, a post, a control panel, a lever, a handle, or any one of operating devices such as a steering wheel) of a vehicle, for example, an automobile, a car of a railroad vehicle, a ship, or aircraft.

An embodiment of the present disclosure relates to [1] to [13] and [A] to [H] below.

[1] A decorative sheet including:
a design layer that displays a design; and
a raised layer stacked to the design layer,
in which the raised layer includes a raised portion provided in a region overlapping a partial region of the design layer,
in which the raised portion includes a binder resin, resin particles, and inorganic particles, in which an average particle size of the resin particles is larger than an average particle size of the inorganic particles, and in which the raised portion includes protrusions formed by protrusion of the inorganic particles.

[2] The decorative sheet according to [1], in which the average particle size of the resin particles is larger than an average thickness of the raised portion, and in which the average particle size of the inorganic particles is larger than a half of the average thickness of the raised portion.

[3] The decorative sheet according to [1] or [2], in which the raised portion includes one protrusion formed by protrusion of one of the inorganic particles, another protrusion formed by protrusion of another one of the inorganic particles, and a depression located between the one protrusion and the other protrusion, and in which a thickness of the raised portion in at least one of the depression is smaller than an average thickness of the raised portion.

[4] The decorative sheet according to any one of [1] to [3], in which the raised portion includes one protrusion formed by protrusion of one of the inorganic particles, another protrusion formed by protrusion of another one of the inorganic particles, and a depression located between the one protrusion and the other protrusion, and in which a thickness of the raised portion in at least one of the depression is smaller than a particle size of the one of the inorganic particles and smaller than a particle size of the other one of the inorganic particles.

[5] The decorative sheet according to any one of [1] to [4], in which the raised portion includes one protrusion formed by protrusion of one of the inorganic particles, another protrusion formed by protrusion of another one of the inorganic particles, and a depression located between the one protrusion and the other protrusion, and in which a thickness of the raised portion in at least one of the depression is smaller than the average particle size of the inorganic particles.

[6] The decorative sheet according to any one of [1] to [5], in which a top of at least part of the inorganic particles is exposed from the binder resin.

[7] The decorative sheet according to any one of [1] to [6], in which the average particle size of the resin particles is larger than twice the average particle size of the inorganic particles.

[8] The decorative sheet according to any one of [1] to [7], in which an average thickness of the raised portion at a position at which the resin particles are not present is 80% or more and 130% or less of the average particle size of the inorganic particles.

[9] The decorative sheet according to any one of [1] to [8], in which the average particle size of the resin particles is 20 µm or more and 70 µm or less, and in which the average particle size of the inorganic particles is 5 µm or more and 20 µm or less.

[10] The decorative sheet according to any one of [1] to [9], in which the raised portion includes 100 parts by mass of the resin particles and 40 parts by mass or more and 200 parts by mass or less of the inorganic particles.

[11] The decorative sheet according to any one of [1] to [10], in which, when a region where the raised portion has a thickness of more than 6 µm and 20 µm or less is defined as R1 and a region where the raised portion has a thickness of more than 20 µm and 55 µm or less is defined as R2, (1) and (2) below are satisfied, (1) a proportion of the R1 to a total area of the region where the raised portion is provided is 35% or more and 55% or less, and (2) a proportion of the R2 to the total area of the region where the raised portion is provided is 20% or more and 40% or less.

[12] The decorative sheet according to [11], in which, when a region where the raised portion has a thickness of 6 µm or less is defined as R0 and a region where the raised portion has a thickness of more than 55 µm is defined as R3, (3) and (4) below are satisfied, (3) a proportion of the R0 to the total area of the region where the raised portion is provided is 20% or less, and (4) a proportion of the R3 to the total area of the region where the raised portion is provided is 5% or less.

[13] A decorative member including:

the decorative sheet according to any one of [1] to [12]; and a support member that supports the decorative sheet.

[A] A decorative sheet including a raised portion in at least a partial region on or above a substrate, in which the raised portion includes a binder resin, resin particles, and inorganic particles, and in which a thickness of the raised portion is partially different.

[B] The decorative sheet according to [A], in which, when an average particle size of the resin particles is defined as D1 and an average particle size of the inorganic particles is defined as D2, D2<D1 is satisfied.

[C] The decorative sheet according to [A] or [B], in which, when an average particle size of the resin particles is defined as D1 and an average particle size of the inorganic particles is defined as D2, the D1 is 20 µm or more and 70 µm or less and the D2 is 5 µm or more and 20 µm or less.

[D] The decorative sheet according to any one of [A] to [C], in which 40 parts by mass or more and 200 parts by mass or less of the inorganic particles are included with respect to 100 parts by mass of the resin particles.

[E] The decorative sheet according to any one of [A] to [D], in which, when a region where the raised portion has a thickness of more than 6 µm and 20 µm or less is defined as R1 and a region where the raised portion has a thickness of more than 20 µm and 55 µm or less is defined as R2, (1) and (2) below are satisfied, (1) a proportion of the R1 to a total area of the region where the raised portion is provided is 35% or more and 55% or less, and (2) a proportion of the R2 to the total area of the region where the raised portion is provided is 20% or more and 40% or less.

[F] The decorative sheet according to [E], in which, when a region where the raised portion has a thickness of 6 µm or less is defined as R0 and a region where the raised portion has a thickness of more than 55 µm is defined as R3, (3) and (4) below are satisfied, (3) a proportion of the R0 to the total area of the region where the raised portion is provided is 20% or less, and (4) a proportion of the R3 to the total area of the region where the raised portion is provided is 5% or less.

[G] The decorative sheet according to any one of [A] to [F], in which the decorative sheet includes the raised portion in the partial region on or above the substrate.

[H] The decorative sheet according to any one of [A] to [G], in which the decorative sheet includes a design layer between the substrate and the raised portion.

EXAMPLES

The present disclosure will be described in more detail according to examples. The present disclosure is not limited to the examples below.

1. Measurement and Evaluation

Decorative sheets of Examples and Comparative Examples were measured and evaluated as follows. The atmosphere at the time of each measurement and evaluation was set to a temperature of 23±5° C., and a relative humidity of 40% or more and 65% or less. Before the start of each measurement and evaluation, a target sample was exposed to the atmosphere for 30 minutes or more and then measured and evaluated. The results are presented in Table 1.

1-1. Tactile Sensation

For the decorative sheets obtained in Examples and Comparative Examples, 20 subjects evaluated the tactile sensation. The 20 subjects included five subjects of 20s, five subjects of 30s, five subjects of 40s, and five subjects of 50s. Each subject touched the surface of the decorative sheet with the pad of the index finger of the dominant hand, and it was evaluated whether the tactile sensation was excellent. Evaluation criteria for whether the tactile sensation was excellent were "whether the protrusions and depressions were strongly felt" and "whether the tactile sensation was naturally felt without discomfort like an artificial object". Table 1 presents the results obtained by classifying the summed evaluations of the tactile sensation according to criteria below.

- A: 18 subjects or more out of 20 subjects answered that the tactile sensation was excellent.
- B: 15 subjects or more and 17 subjects or less out of 20 subjects answered that the tactile sensation was excellent.
- C: 11 subjects or more and 14 subjects or less out of 20 subjects answered that the tactile sensation was excellent.
- D: 10 subjects or less out of 20 subjects answered that the tactile sensation was excellent.

1-2. Low Gloss

For the decorative sheets obtained in Examples and Comparative Examples, 20 subjects evaluated the gloss. The 20 subjects included five subjects of 20s, five subjects of 30s, five subjects of 40s, and five subjects of 50s. Each subject visually observed the decorative sheet from the raised layer side and evaluated whether the gloss of the portion having the raised portion was reduced. The evaluation was performed under fluorescent lighting in a room shielded from external light. An evaluation criterion for whether the gloss was reduced was whether the gloss was sufficiently reduced in the portion having the raised portion as compared with the portion having no raised portion. Table 1 presents the results obtained by classifying the summed evaluations of the low gloss according to criteria below.

- A: 18 subjects or more out of 20 subjects answered that the gloss of the raised portion was reduced.
- B: 15 subjects or more and 17 subjects or less out of 20 subjects answered that the gloss of the raised portion was reduced.
- C: 11 subjects or more and 14 subjects or less out of 20 subjects answered that the gloss of the raised portion was reduced.
- D: 10 subjects or less out of 20 subjects answered that the gloss of the raised portion was reduced.

2. Fabrication of Decorative Sheet

Example 1

A colored base paper for a building member ("CHPS45 (model number)", basis weight: 45 g/m$^2$, manufactured by Tentok Paper Co., Ltd.) was used as a substrate. A colored layer having a thickness of 5 μm was formed on a surface of the substrate subjected to an adhesion-facilitating treatment by a gravure printing method with a resin composition including a mixture resin of an acrylic resin and an urethane resin as a binder, and titanium white, red iron oxide, and chrome yellow as a colorant.

Then, a picture layer having a woodgrain pattern was formed on the colored layer by using a resin composition including a nitrocellulose as a binder and a colorant including red iron oxide as a main component. With the colored layer and the picture layer, a design layer was formed on the substrate.

Then, a primer layer having a thickness of 5 μm was formed by applying an ink for a primer layer including a two-part curable resin (main agent: acrylic polyol, curing agent: hexamethylene diisocyanate) to the entire surface of the design layer and drying the ink for a primer layer.

Then, a raised layer was formed by applying an ink 1 for a raised layer having a formulation below to a partial region on the primer layer by a gravure printing method and drying the ink 1 for a raised layer. A gravure printing plate having two types of cell depths was used (a plate having cells with a depth of 20 μm and cells with a depth of 90 μm at an area ratio of 3:1). The solid adhesion amount of the ink 1 for a raised layer was about 4 g/m$^2$ on average in the region where the ink adhered. Then, heat curing was performed at 70° C. for 24 hours to obtain a decorative sheet of Example 1. When a longitudinal section of the obtained decorative sheet was observed with a microscope, the raised portion included protrusions formed by protrusion of the inorganic particles.

<Ink 1 for Matte Layer>

Two-part curable resin: 100 parts by mass
(Main Agent: Acrylic Polyol, Curing Agent: Hexamethylene Diisocyanate)
Resin particles: 20 parts by mass
(Spherical Polymethyl Methacrylate Particles, Average Particle Size: 50 μm)
Inorganic particles: 15 parts by mass
(Spherical Silica Particles, Average Particle Size: 12 μm)
Solvent: appropriate amount Example 2

A decorative sheet of Example 2 was obtained in a manner similar to Example 1 except that the resin particles of the ink 1 for a raised layer were changed to spherical polymethyl methacrylate particles having an average particle size of 35 μm. When a longitudinal section of the obtained decorative sheet was observed with a microscope, the raised portion included protrusions formed by protrusion of the inorganic particles.

Example 3

A decorative sheet of Example 3 was obtained in a manner similar to Example 1 except that the additive amount of the resin particles was changed to 23 parts by mass and the additive amount of the inorganic particles was changed to 11 parts by mass in the ink 1 for a raised layer. When a longitudinal section of the obtained decorative sheet was observed with a microscope, the raised portion included protrusions formed by protrusion of the inorganic particles.

Comparative Example 1

A decorative sheet of Comparative Example 1 was obtained in a manner similar to Example 1 except that the resin particles were removed from the ink 1 for a raised layer and the additive amount of the inorganic particles was changed from 14 parts by mass to 27 parts by mass.

Comparative Example 2

A decorative sheet of Comparative Example 2 was obtained in a manner similar to Example 1 except that the inorganic particles were removed from the ink 1 for a raised layer and the additive amount of the resin particles was changed from 19 parts by mass to 37 parts by mass.

Comparative Example 3

The inorganic particles in the ink 1 for a raised layer were changed to spherical silica particles having an average particle size of 6 μm. The additive amount of the inorganic particles in the ink 1 for a raised layer was held at 15 parts by mass. A decorative sheet of Comparative Example 3 was obtained in a manner similar to Example 1 except for the average particle size of the inorganic particles. When a longitudinal section of the obtained decorative sheet was observed with a microscope, the raised portion did not include protrusions formed by protrusion of the inorganic particles. The inorganic particles were embedded in the binder resin and did not protrude from the binder resin.

TABLE 1

|  |  | Example 1 | Example 2 | Example 3 | Comparative Example 1 | Comparative Example 2 | Comparative Example 3 |
|---|---|---|---|---|---|---|---|
| Resin particles | Average particle size (μm) | 50 | 35 | 50 | — | 50 | 50 |
|  | Blending amount (part by mass) | 20 | 20 | 22 |  | 37 | 20 |
| Inorganic particles | Average particle size (μm) | 12 | 12 | 12 | 12 | — | 6 |
|  | Blending amount (part by mass) | 15 | 15 | 12 | 17 |  | 15 |
|  | tactile sensation | A | B | A | D | B | C |
|  | Low gloss | A | A | B | A | D | D |

REFERENCE SIGNS LIST

100: decorative member, 15: support member, 20: decorative sheet, 30: substrate, 40: design layer, 50: raised layer, 55: raised portion, 56, 56A, 56B: protrusion, 57, 57B: depression, 60: binder resin, 61: resin particle, 62: inorganic particle

The invention claimed is:

1. A decorative sheet comprising:
a design layer that displays a design; and
a raised layer stacked to the design layer,
wherein the raised layer includes a raised portion provided in a region overlapping only a partial region of the design layer,
wherein the raised portion includes a binder resin, resin particles, and inorganic particles,
wherein an average particle size of the resin particles is larger than an average particle size of the inorganic particles,
wherein the raised portion includes protrusions formed by protrusion of the inorganic particles,
wherein an average thickness of the raised portion is 12 μm or more and 60 μm or less, and
wherein the raised portion is provided to correspond to the design displayed by the design layer in order to reproduce an appearance and a tactile sensation of the design layer.

2. The decorative sheet according to claim 1,
wherein the average particle size of the resin particles is larger than an average thickness of the raised portion, and
wherein the average particle size of the inorganic particles is larger than a half of the average thickness of the raised portion.

3. The decorative sheet according to claim 1,
wherein the raised portion includes one protrusion formed by protrusion of one of the inorganic particles, another protrusion formed by protrusion of another one of the inorganic particles, and a depression located between the one protrusion and the other protrusion, and
wherein a thickness of the raised portion in at least one of the depression is smaller than an average thickness of the raised portion.

4. The decorative sheet according to claim 1,
wherein the raised portion includes one protrusion formed by protrusion of one of the inorganic particles, another protrusion formed by protrusion of another one of the inorganic particles, and a depression located between the one protrusion and the other protrusion, and
wherein a thickness of the raised portion in at least one of the depression is smaller than a particle size of the one of the inorganic particles and smaller than a particle size of the other one of the inorganic particles.

5. The decorative sheet according to claim 1,
wherein the raised portion includes one protrusion formed by protrusion of one of the inorganic particles, another protrusion formed by protrusion of another one of the inorganic particles, and a depression located between the one protrusion and the other protrusion, and
wherein a thickness of the raised portion in at least one of the depression is smaller than the average particle size of the inorganic particles.

6. The decorative sheet according to claim 1, wherein a top of at least part of the inorganic particles is exposed from the binder resin.

7. The decorative sheet according to claim 1, wherein the average particle size of the resin particles is larger than twice the average particle size of the inorganic particles.

8. The decorative sheet according to claim 1, wherein an average thickness of the raised portion at a position at which the resin particles are not present is 80% or more and 130% or less of the average particle size of the inorganic particles.

9. The decorative sheet according to claim 1,
wherein the average particle size of the resin particles is 20 μm or more and 70 μm or less, and
wherein the average particle size of the inorganic particles is 5 μm or more and 20 μm or less.

10. The decorative sheet according to claim 1, wherein the raised portion includes 100 parts by mass of the resin particles and 40 parts by mass or more and 200 parts by mass or less of the inorganic particles.

11. The decorative sheet according to claim 1,
wherein, when a region where the raised portion has a thickness of more than 6 μm and 20 μm or less is defined as R1 and a region where the raised portion has a thickness of more than 20 μm and 55 μm or less is defined as R2, (1) and (2) below are satisfied, (1) a proportion of the R1 to a total area of the region where the raised portion is provided is 35% or more and 55% or less, and (2) a proportion of the R2 to the total area of the region where the raised portion is provided is 20% or more and 40% or less.

12. The decorative sheet according to claim 11,
wherein, when a region where the raised portion has a thickness of 6 μm or less is defined as R0 and a region where the raised portion has a thickness of more than 55 μm is defined as R3, (3) and (4) below are satisfied, (3) a proportion of the R0 to the total area of the region where the raised portion is provided is 20% or less, and (4) a proportion of the R3 to the total area of the region where the raised portion is provided is 5% or less.

13. A decorative member comprising:
the decorative sheet according to claim 1; and
a support member that supports the decorative sheet.

* * * * *